(12) United States Patent
Marupaduga et al.

(10) Patent No.: US 9,042,323 B1
(45) Date of Patent: May 26, 2015

(54) METHOD AND SYSTEM OF ACTIVATING A GLOBAL BEAM IN A COVERAGE AREA

(71) Applicant: Sprint Spectrum L.P., Overland Park, KS (US)

(72) Inventors: Sreekar Marupaduga, Overland Park, KS (US); Nicholas Kullman, Kansas City, MO (US); Andrew M. Wurtenberger, Olathe, KS (US); Matt Masters, Greenfield, IN (US)

(73) Assignee: Sprint Spectrum L.P., Overland Park, KS (US)

( * ) Notice: Subject to any disclaimer, the term of this patent is extended or adjusted under 35 U.S.C. 154(b) by 160 days.

(21) Appl. No.: 13/745,227

(22) Filed: Jan. 18, 2013

(51) Int. Cl.
*H04W 72/04* (2009.01)
*H04B 7/06* (2006.01)
*H04B 7/04* (2006.01)

(52) U.S. Cl.
CPC ........... *H04W 72/044* (2013.01); *H04B 7/0602* (2013.01); *H04B 7/0491* (2013.01)

(58) Field of Classification Search
None
See application file for complete search history.

(56) References Cited

U.S. PATENT DOCUMENTS

| | | | | |
|---|---|---|---|---|
| 5,649,292 | A * | 7/1997 | Doner | 455/447 |
| 6,002,935 | A * | 12/1999 | Wang | 455/447 |
| 6,091,788 | A * | 7/2000 | Keskitalo et al. | 375/347 |
| 6,094,165 | A * | 7/2000 | Smith | 342/373 |
| 7,236,808 | B2 | 6/2007 | Goldberg | |
| 7,454,223 | B2 * | 11/2008 | Mantha et al. | 455/522 |
| 7,620,420 | B2 * | 11/2009 | Higuchi et al. | 455/562.1 |
| 7,657,288 | B2 * | 2/2010 | Chitrapu et al. | 455/562.1 |
| 7,680,518 | B2 * | 3/2010 | Iacono et al. | 455/562.1 |
| 8,107,915 | B2 * | 1/2012 | Bally et al. | 455/277.1 |
| 8,160,611 | B1 | 4/2012 | Oroskar | |
| 8,195,190 | B1 * | 6/2012 | Hou | 455/456.1 |
| 8,295,228 | B2 * | 10/2012 | Tangemann | 370/328 |
| 8,295,874 | B2 * | 10/2012 | Harris et al. | 455/522 |
| 8,433,934 | B1 * | 4/2013 | On | 713/300 |
| 8,665,846 | B2 * | 3/2014 | O'Keefe | 370/338 |
| 2004/0063467 | A1 | 4/2004 | Shapira et al. | |
| 2004/0204109 | A1 | 10/2004 | Hoppenstein | |
| 2008/0207194 | A1 | 8/2008 | Chae et al. | |
| 2009/0046573 | A1 * | 2/2009 | Damnjanovic | 370/216 |
| 2009/0046665 | A1 * | 2/2009 | Robson et al. | 370/332 |
| 2009/0323530 | A1 | 12/2009 | Trigui et al. | |
| 2011/0223922 | A1 | 9/2011 | Kiiski et al. | |
| 2012/0044917 | A1 | 2/2012 | O'Keeffe | |
| 2012/0106346 | A1 * | 5/2012 | Aguirre et al. | 370/237 |

(Continued)

OTHER PUBLICATIONS

Cho, et al., Optimization of Vertical and Horizontal Beamforming Kernals on the PowerPC G4 Processor wth AltiVec Technology, IEEE, 2000, pp. 1-5.

(Continued)

*Primary Examiner* — Hassan Kizou
*Assistant Examiner* — Tejis Daya

(57) ABSTRACT

A base station may be configured to emit a plurality of beams in a given coverage area, where each beam defines a different respective sub-coverage area of the given coverage area and serves wireless communication devices (WCDs) located in the respective sub-coverage area. While emitting these beams, the base station may detect that there is a threshold number of highly-mobile WCDs located in the given coverage area. In response, the base station may activate a global beam that serves WCDs located anywhere in the given coverage area. In turn, the base station may assign at least one highly-mobile WCD located in the given coverage area to the global beam.

20 Claims, 4 Drawing Sheets

(56) References Cited

U.S. PATENT DOCUMENTS

2012/0196591 A1 8/2012 O'Keeffe
2012/0281672 A1 11/2012 Ohm et al.
2013/0235807 A1* 9/2013 Lee et al. .................. 370/329

OTHER PUBLICATIONS

Koppenborg, et al., 3D Beamforming Trials with an Active Antenna, IEEE, 2012, pp. 110-114.

Nokia Siemens Networks, Active Antenna Systems: A Step-change in Base Station Site Performance, White Paper, 2012 (found at http://www.nokiasiemensnetworks.com/sites/default/files/document/nokia_siemens_networks_active_antenna_system_white_paper_26_01_12_0.pdf).

Unpublished U.S. Appl. No. 11/532,407, filed Sep. 15, 2006 entitled "Carrier Selection Based on Probable Mobility of Packet Flow".

* cited by examiner

METHOD AND SYSTEM OF ACTIVATING A GLOBAL BEAM IN A COVERAGE AREA

BACKGROUND

A typical wireless carrier network includes a number of base stations that radiate to define wireless coverage areas, such as cells and cell sectors, in which wireless communication devices (WCDs) can operate and engage in air-interface communication with the wireless carrier network. Each base station may then be coupled with equipment that provides connectivity with one or more transport networks, such as the public switched telephone network (PSTN) and/or the Internet for instance. Within this arrangement, a WCD operating in a coverage area of the wireless carrier network can engage in communication, via the wireless carrier network, with other WCDs operating in the wireless carrier network as well as with remote entities sitting outside of the wireless carrier network.

The wireless carrier network may operate in accordance with an agreed air-interface protocol or "radio access technology," examples of which include Code Division Multiple Access (CDMA) (e.g., 1xEV-DO and 1xRTT), Long Term Evolution (LTE) (e.g., FDD LTE and TDD LTE), WiMAX, iDEN, TDMA, AMPS, Global System for Mobile Communications (GSM), GPRS, UMTS, EDGE, MMDS, WI-FI, and BLUETOOTH. Generally, the agreed air-interface protocol may define a downlink (or forward link) for carrying communications from the base stations to WCDs and an uplink (or reverse link) for carrying communications from WCDs to the base stations. Further, the agreed air-interface protocol may employ techniques such time-division multiplexing, frequency-division multiplexing, and/or code-division multiplexing to divide the downlink and uplink into discrete resources (e.g., LTE resource blocks, 1xEV-DO timeslot resources, etc.), which may then be used to carry control and/or bearer data between the base station and particular WCDs.

OVERVIEW

Due to advances in antenna system technology, a base station may now be capable of emitting two or more distinct radiation patterns (or "beams") in a given coverage area, each defining a different respective sub-coverage area of the given coverage area and serving WCDs located in the respective sub-coverage area. By doing so, the base station may able to provide WCDs with better coverage in each of the sub-coverage areas—and thus in the given coverage area as a whole. However, by splitting the given coverage area in this manner, the base station may also be required to perform handovers between the beams serving the different sub-coverage areas. For instance, as a given WCD moves from one sub-coverage area to another, the base station may need to transition from assigning resources for the given WCD on one beam to assigning resources for the given WCD on another beam. This may begin to impose a processing burden on the base station as the number of handovers increases.

Disclosed herein are methods and systems that help to address this issue. According to embodiments of the disclosed methods, a base station may emit two or more beams in a given coverage area to split the given coverage area into different sub-coverage areas. While emitting these beams, the base station may detect that there is a threshold number of highly-mobile WCDs located in the given coverage area—which are WCDs that may be more likely to engage in handovers between the sub-coverage area beams. In response, the base station may activate a global beam that serves WCDs located anywhere in the given coverage area. In turn, the base station may assign at least one highly-mobile WCD located in the given coverage area to the global beam. By doing so, the disclosed methods may reduce the number of handovers that the base station is required to perform between the sub-coverage area beams in the given coverage area, which may reduce the processing burden imposed on the base station.

One example embodiment of the disclosed methods may include (a) emitting a plurality of beams in a given coverage area of a radio access network (RAN), wherein each beam defines a different respective sub-coverage area of the given coverage area and serves WCDs located in the respective sub-coverage area, (b) detecting that there is a threshold number of highly-mobile WCDs located in the given coverage area, (c) in response to the detecting, activating a global beam that serves WCDs located anywhere in the given coverage area, and (d) assigning at least one highly-mobile WCD located in the given coverage area to the global beam.

The feature of emitting the plurality of beams in the given coverage area may take various forms. In one implementation, for instance, this feature may be carried out using vertical beamforming, in which case the plurality of beams may include a first beam that defines an inner sub-coverage area of the given coverage area and a second beam that defines an outer sub-coverage area of the given coverage area. In another implementation, this feature may be carried out using horizontal beamforming. Other implementations are possible as well.

Further, the feature of detecting that there is the threshold number of highly-mobile WCDs located in the given coverage area may take various forms. In one implementation, for instance, this feature may involve (a) calculating a number of highly-mobile WCDs located in the given coverage area (e.g., based on data indicating a mobility level of WCDs located in the given coverage area), (b) comparing the calculated number to the threshold number, and (c) based on the comparing, determining that the calculated number is greater than or equal to the threshold number. Other implementations are possible as well.

Further yet, the feature of activating the global beam may take various forms. In one implementation, for instance, this feature may involve activating the global beam using a given set of antenna elements that were arranged to form the global beam and were not in use prior to activation of the global beam. In another implementation, this feature may involve (a) deallocating a given set of antenna elements being used to form the plurality of beams defining the sub-coverage areas, (b) dynamically arranging the given set of antenna elements to form the global beam, and (c) activating the global beam using the given set of antenna elements. Additionally, this feature may also involve reallocating a given portion of the given coverage area's resources (e.g., LTE resource blocks, etc.) from the plurality of beams defining the sub-coverage areas to the global beam. The feature of activating the global beam may involve other actions as well.

Still further, the feature of assigning the at least one highly-mobile WCD located in the given coverage area to the global beam may take various forms. In one implementation, for instance, this feature may involve (a) selecting the at least one highly-mobile WCD, (b) optionally notifying the at least one highly-mobile WCD of the assignment to the global beam, (c) ceasing to assign resources to the at least one highly-mobile WCD on the beam defining the sub-coverage area in which the at least one highly-mobile WCD is located, and (d) beginning to assign resources to the at least one highly-mobile WCD on the global beam. Other implementations are possible as well.

This example embodiment of the disclose methods may also include other features. For example, the example embodiment may additionally include dynamically adjusting the plurality of beams defining the sub-coverage areas based on one or more metrics that reflect WCD distribution in the given coverage area. As another example, after activating the global beam, the example embodiment may additionally include detecting that there is no longer the threshold number of highly-mobile WCDs located in the given coverage area and then responsively (a) deactivating the global beam and (b) assigning each WCD being served by the global beam to the beam defining the sub-coverage area in which the WCD is located. The example embodiment may include other features as well.

Also disclosed herein are structures configured to facilitate implementation of the disclosed methods. One embodiment of the disclosed structures may take the form of a base station that includes (a) a wireless communication interface for radiating to define one or more coverage areas in which the base station can engage in air interface communication with WCDs (which may include an active antenna array in one example), (b) a processing unit, (c) data storage, and (d) program instructions stored in the data storage and executable by the processing unit to carry out functions such as those disclosed herein. Another embodiment of the disclosed structures may take the form of a non-transitory computer readable medium having instructions stored thereon that are executable by a processing unit to carry out functions such as those disclosed herein.

These as well as other aspects and advantages will become apparent to those of ordinary skill in the art by reading the following detailed description, with reference where appropriate to the accompanying drawings.

DETAILED DESCRIPTION

Figure 1:
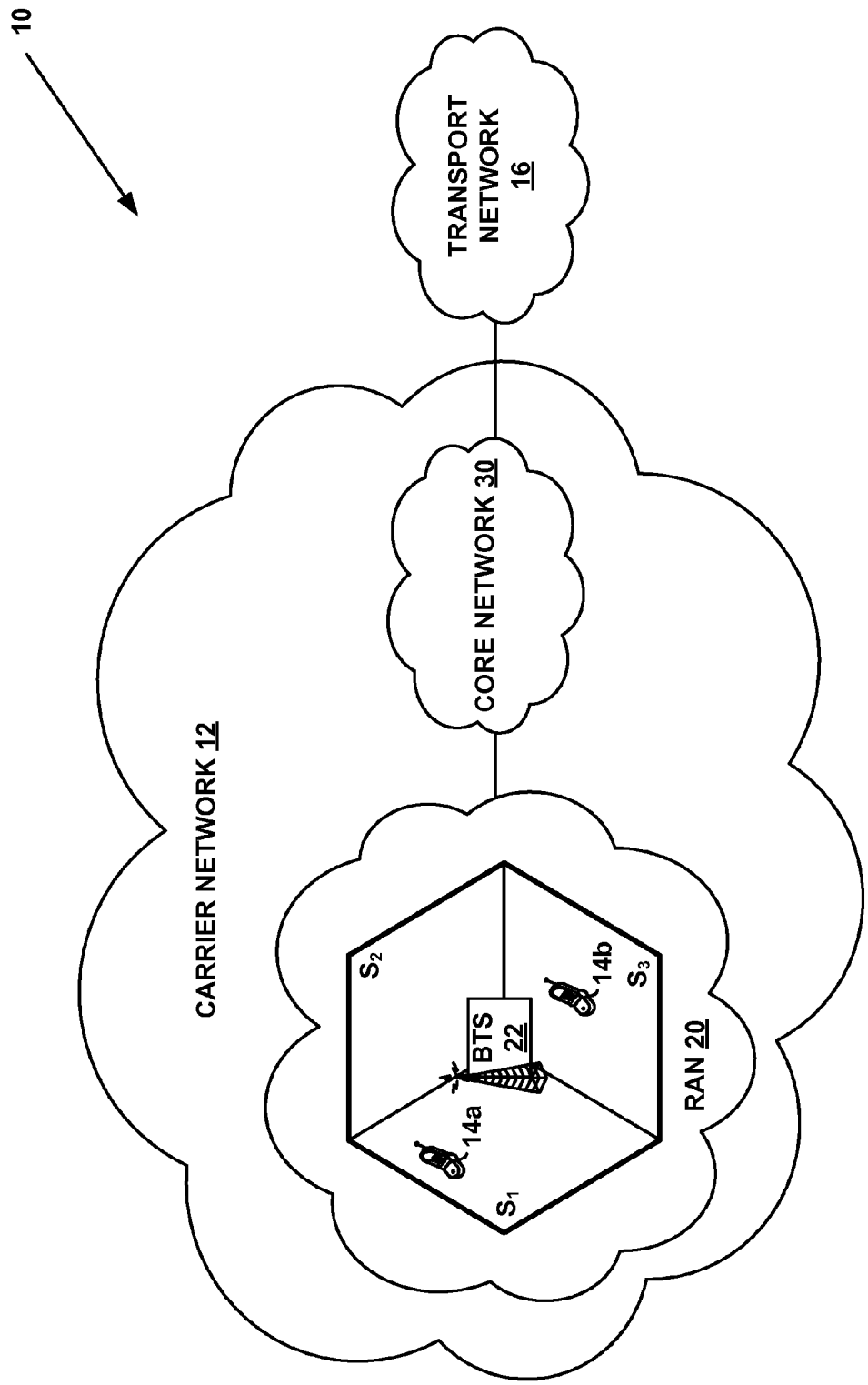
FIG. 1 is a simplified block diagram of an example communication system in which in which embodiments of the disclosed methods can be implemented.

Referring to the drawings, FIG. 1 is a simplified block diagram of an example communication system 10 in which embodiments of the disclosed methods can be implemented. It should be understood, however, that this and other arrangements described herein are set forth as examples only. As such, those skilled in the art will appreciate that other arrangements and elements (e.g., machines, interfaces, functions, orders of functions, etc.) can be used instead, some elements may be added, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware and/or software logic. For instance, various functions may be carried out by a processor executing instructions written in any suitable programming language and stored in memory.

FIG. 1 depicts example system 10 as including a representative wireless carrier network 12 that facilitates wireless communication with wireless communication devices (WCDs), such as representative WCDs 14a-b, and provides connectivity with one or more transport networks (e.g., the public switched telephone network (PSTN) and/or the Internet), such as representative transport network 16. Wireless carrier network 12 may take the form of one or more radio access networks (RANs), such as representative RAN 20, each communicatively coupled to a core network 30. Other arrangements are possible as well.

RAN 20 may include one or more base stations (e.g., base transceiver stations (BTSs), access nodes, node-Bs, eNodeBs, etc.), each including an antenna system for emitting radio frequency (RF) radiation on a base carrier frequency to define one or more coverage areas in which the base station can engage in air-interface communication with WCDs. (In some implementations, the antenna system may also emit RF radiation on a secondary carrier frequency in one or more coverage areas.) For example, FIG. 1 shows RAN 20 as including a representative base station 22 with an antenna system that emits RF radiation patterns in three different directions to define three representative cell sectors $S_1$-$S_3$, each having the same carrier frequency but a different sector identifier. It should be understood, however, that this depicted arrangement of coverage areas is for purposes of illustration only, and that numerous other arrangements of coverage areas are possible as well.

As noted above, in practice, base stations such as base station 22 may be arranged to engage in air-interface communication with WCDs according to an agreed air-interface protocol (such as one of those noted above) that defines a downlink for carrying communications from base station 22 to WCDs and an uplink for carrying communications from WCDs to base station 22. And the agreed air-interface protocol may also employ techniques such time-division multiplexing, frequency-division multiplexing, and/or code-division multiplexing to divide the downlink and uplink into discrete resources that can be allocated for carrying control and/or bearer data between base station 22 and particular WCDs.

As one representative example, an LTE protocol may define a downlink that takes the form of a 5 MHz, 10 MHz, or 20 MHz carrier-frequency channel. In turn, the LTE protocol may divide the downlink in both the time and frequency domains to define "resource blocks," each taking the form of a timeslot having a duration of 0.5 milliseconds (ms) and spanning a set of twelve 15-kHz sub-carriers (for a total bandwidth of 180 kHz). These downlink resource blocks may then be assigned to particular WCDs such that each assigned resource block may carry control and/or bearer data intended for a particular WCD (or group of WCDs). These assigned resource blocks may also carry other information, such as shared control data (e.g., a reference signal for the given coverage area). An LTE protocol may divide the uplink in a similar manner.

As another representative example, a 1xEV-DO protocol may define a downlink that takes the form of a 1.25 MHz carrier-frequency channel. In turn, the 1xEV-DO protocol may divide the downlink in the time domain into timeslot resources, each having a length of 2048 chips and a duration of approximately 1.67 ms. Each downlink timeslot may then be further divided in the time domain into two 1024 chip half slots, each arranged to carry a 76 chip forward pilot channel, two 64 chip forward medium access control (MAC) channel segments, and two 400 chip forward data segments for carrying control and/or bearer data. These downlink timeslots may then be assigned to particular WCDs using MAC identifiers, such that each assigned timeslot may carry control and/or bearer data intended for a particular WCD (or group of WCDs). More recent versions of 1xEV-DO may divide the uplink in a similar manner, while previous versions of 1xEV-DO may divide the uplink into code channels using "Walsh codes."

Referring back to FIG. 1, in embodiments of the disclosed methods, base station 22 may also be capable of splitting a given coverage area into multiple different sub-coverage areas. For instance, base station 22 may emit two or more distinct radiation patterns (or "beams") in the given coverage area, each defining a different respective sub-coverage area of the given coverage area and serving WCDs located in the respective sub-coverage area. In practice, base station 22 may form the different beams using different sets of antenna elements (which may be part of a single antenna array or multiple different antenna arrays) that work together to produce the desired radiation patterns. Base station 22 may carry out this beamforming in various manners.

Figure 2A:
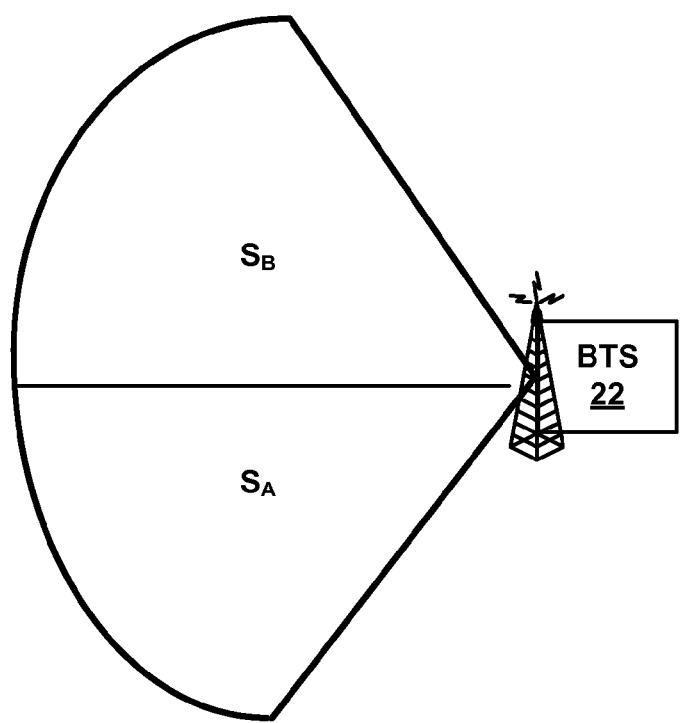
FIG. 2(a) depicts an example implementation of horizontal beamforming.

According to one technique, base station 22 may form two or more distinct beams in different horizontal directions within a given coverage area (e.g., via two or more different sets of antenna elements) to define horizontal sub-coverage areas of the given coverage area. This technique is commonly referred to as "horizontal beamforming." One implementation of horizontal beamforming is depicted in FIG. 2(a), which shows base station 22 emitting a first beam in a given sector that defines a left sub-sector $S_A$ and a second beam in the given sector that defines a right sub-sector $S_B$. Various other implementations of horizontal beamforming are possible as well. For example, while FIG. 2(a) depicts the given sector being split into two horizontal sub-sectors, it should be understood that the given sector could be split into more than two horizontal sub-sectors. As another example, while FIG. 2(a) depicts the given sector being split into horizontal sub-sectors that are non-overlapping, it should be understood that the given sector could be split into horizontal sub-sectors that partially overlap (e.g., at a boundary between such sub-sectors). Other examples are possible as well.

Figure 2B:
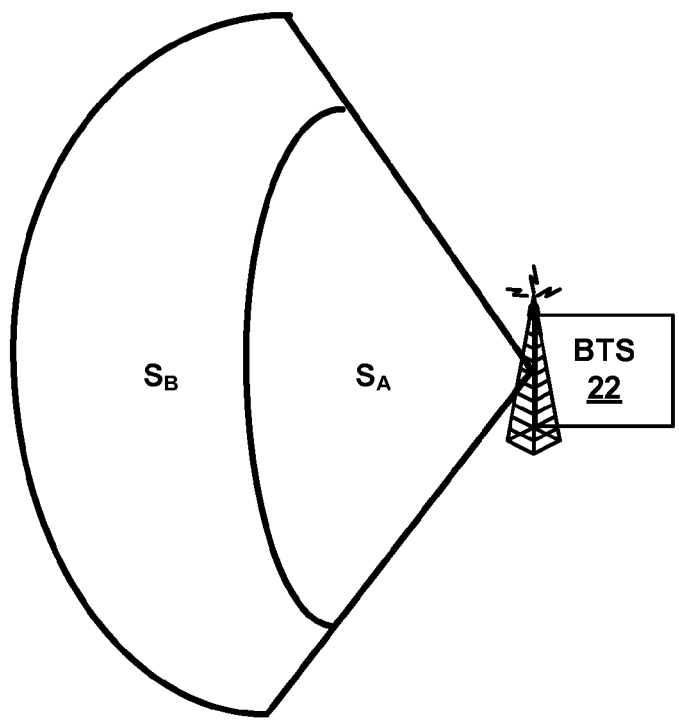
FIG. 2(b) depicts an example implementation of vertical beamforming.

According to another technique, base station 22 may emit two or more distinct beams in different vertical directions within a given coverage area (e.g., via two or more different sets of antenna elements) to define vertical sub-coverage areas of the given coverage area. This technique is commonly referred to as "vertical beamforming." One implementation of vertical beamforming is depicted in FIG. 2(b), which shows base station 22 emitting a first beam in a given sector that defines an inner sub-sector $S_A$ and a second beam in the given sector that defines an outer sub-sector $S_B$. Various other implementations of vertical beamforming are possible as well. For example, while FIG. 2(b) depicts the given sector being split into two vertical sub-sectors, it should be understood that the given sector could be split into more than two vertical sub-sectors. As another example, while FIG. 2(b) depicts the given sector being split into vertical sub-sectors that are non-overlapping, it should be understood that the given sector could be split into vertical sub-sectors that partially overlap (e.g., at a boundary between such sub-sectors). Other examples are possible as well.

These two techniques for beamforming may also be combined, such that base station 22 may emit distinct beams in both the horizontal and vertical directions within a given coverage area. This technique may be referred to as "three-dimensional beamforming." Base station 22 may also employ any other technique now known or later developed to split the coverage of a given coverage area into multiple sub-coverage areas.

When base station 22 splits a given coverage area into different sub-coverage areas, base station 22 may also distribute the given coverage area's resources between the beams serving the different sub-coverage areas. For example, according to an LTE protocol, base station 22 may distribute the given coverage area's downlink and uplink resource blocks between the beams serving the different sub-coverage areas, such that only a respective portion of the given coverage area's total resource blocks can be assigned to WCDs on each beam. As another example, according to a 1xEV-DO protocol, base station 22 may distribute the given coverage area's downlink and uplink timeslot resources (or uplink code channels) between the beams serving the different sub-coverage areas, such that only a respective portion of the given coverage area's total timeslot resources (or Walsh codes) can be assigned to WCDs on each beam. Base station 22 may distribute resources between the beams serving the different sub-coverage areas in other manners as well. (It should be understood that, in alternate implementations, each beam may be allocated a full set of coverage-area resources, in which case the overall resources for the given coverage area would be multiplied by the number of beams in the given coverage area).

In embodiments of the disclosed methods, base station 22 may also be capable of dynamically adjusting the beams that define the respective sub-coverage areas of a given coverage area. Base station 22 may carry out the dynamic adjustment based on various criteria that reflects WCD distribution in the given coverage area, examples of which include the number of idle and/or active WCDs located in the sub-coverage areas, demand for control and/or traffic data in the sub-coverage areas, and resource utilization in the sub-coverage areas. Further, base station 22 may carry out the dynamic adjustment in various manners. In one implementation, for instance, base station 22 may adjust various characteristics that define the different beams, such as beam strength, azimuth, horizontal beamwidth, elevation, and/or vertical beamwidth (e.g., by adjusting the phase and/or amplitude emitted by the antenna elements that form the beam). In another implementation, base station 22 may adjust the resources distributed between the different beams, such as the portion of given coverage area's LTE resource blocks and/or 1xEV-DO timeslot resources that can be assigned to WCDs on each of the beams. Base station 22 may carry out the dynamic adjustment in other manners as well.

Referring back to FIG. 1, although not shown, RAN 20 may further include one or more controllers that may provide connectivity to core network 30 and may also help to control aspects of the RAN's one or more base stations, such as aspects of antenna-system operation and/or air-interface communication. In one implementation, for instance, RAN 20 may include a separate controller (e.g., a base station controller (BSC) or radio network controller (RNC)) that sits between base station 22 and core network 30. In another implementation, base station 22 may include an integrated controller. Other arrangements are possible as well, including arrangements in which at least a portion of the controller resides in core network 30.

Core network 30 may then include network infrastructure (not shown) that provides connectivity between RAN 20 and transport network 16 and may also help to control aspects of RAN 20 and its one or more base stations. Depending on the radio access technology employed, this network infrastructure may take various forms. For example, if wireless carrier network 10 is operating in accordance with an LTE protocol, core network 30 may include entities such as a mobility management entity (MME), a serving gateway (SGW), a packet data network gateway (PGW), and/or a home subscriber server (HSS). As another example, if wireless carrier network 10 is operating in accordance with a CDMA protocol, core network 30 may include entities such as a mobile switching center (MSC), a packet data serving node (PDSN), a home location register (HLR), and/or a visitor location register (VLR). The core network's infrastructure may take various other forms as well. (It should also be understood that at least some of these entities might be considered to be part of a network other than core network 30, such as RAN 20.)

Wireless carrier network 12 may also include other networks and/or entities that are not shown. As one possible example, wireless carrier network 12 may include a location system arranged to help determine the locations of WCDs operating in wireless carrier network 12. Various other examples are possible as well.

Representative WCDs 14*a-b* may each be any device capable of engaging in air-interface communication with wireless carrier network 12 according to an agreed air-interface protocol (such as one of those noted above). WCDs 14*a-b* may thus take various forms, examples of which include a cellular telephone, a tablet or other wirelessly-equipped computer, a personal digital assistant (PDA), a personal navigation device (PND), and/or a mobile hotspot. Other examples are possible as well.

Figure 3:
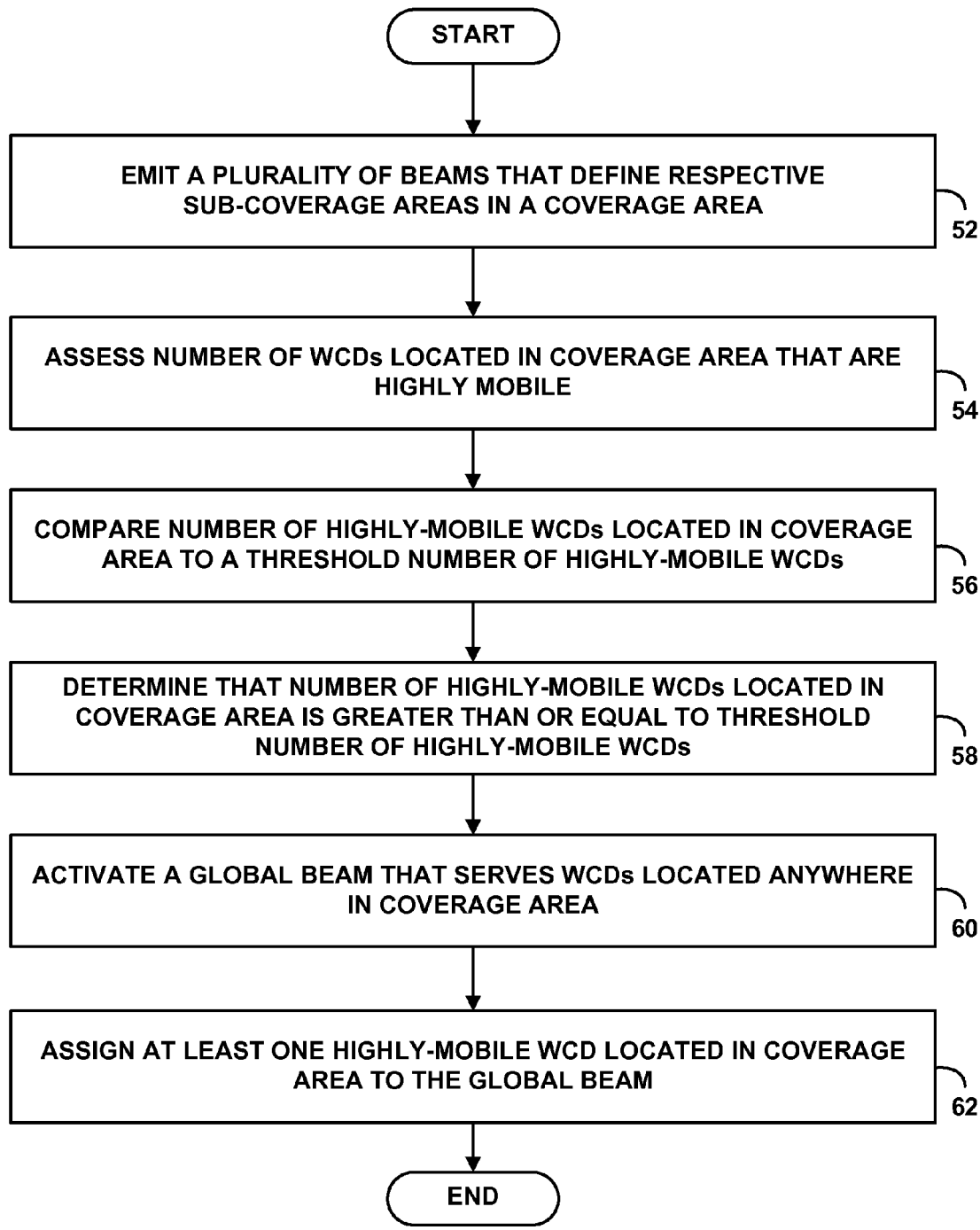
FIG. 3 is a flow chart illustrating functions that can be carried out in accordance with an example embodiment of the disclosed methods.

Turning next to FIG. 3, a flow chart is shown to illustrate functions that can be carried out in accordance with an example embodiment of the disclosed methods. For purposes of illustration only, these functions will be described with reference to example system 10.

As shown in FIG. 3, the example embodiment may begin at step 52 with base station 22 emitting a plurality of beams in a given coverage area, with each beam defining a different respective sub-coverage area of the given coverage area and serving WCDs located in the respective sub-coverage area. As discussed above, in practice, base station 22 may form the plurality of beams and corresponding sub-coverage areas according to various different techniques. For purposes of illustration only, the example embodiment will be described with reference to base station 22 emitting a first beam in sector $S_1$ that defines an inner sub-sector $S_A$ (e.g., via a first set of antenna elements) and a second beam in sector $S_1$ that defines an outer sub-sector $S_B$ (e.g., via a second set of antenna elements). In a preferred example, these beams will have the same carrier frequency and sector identifier (but may have different sub-sector identifiers). An example of such an arrangement is depicted in FIG. 2(*b*).

At step 54, while emitting the plurality of beams in the given coverage area, base station 22 may assess the number of WCDs located in the given coverage area that are highly mobile. Base station 22 may perform this assessment at various times, such as continuously, periodically, and/or in response to some triggering event (e.g., when a new WCD enters the given coverage area). Further, base station 22 may carry out this assessment in various manners.

According to one implementation, base station 22 may carry out this assessment based on stored data indicating a mobility level of WCDs located in the given coverage area. This stored data may be maintained by various entities in wireless carrier network 12, examples of which include base station 22, a controller, an MME, an MSC, and/or a separate database sitting on RAN 20 or core network 30. Further, this stored data may be updated in various manners and take various forms.

In one example, an entity may update the stored data indicating a mobility level of WCDs located in the given coverage area based on the velocity of WCDs located in the given coverage area. For instance, the entity may monitor the velocity of a given WCD located in the given coverage area, such as by monitoring location data for the given WCD (e.g., Global Position System (GPS) and/or round-trip delay data) over the course of time. While performing this monitoring, the entity may then update the stored data to reflect that the given WCD's velocity has changed, risen above a given threshold, fallen below a given threshold, etc. This stored data may take various forms, examples of which include a representation of the given WCD's velocity, a data bit or other indication of whether the given WCD's velocity qualifies it as a highly-mobile WCD (e.g., whether the given WCD's velocity exceeds a threshold), and a representation of the amount of time the given WCD has qualified as a highly-mobile WCD.

In another example, an entity may update the stored data indicating a mobility level of the WCDs located in the given coverage area based on air-interface conditions reported by WCDs located in the given coverage area. For instance, the entity may monitor air-interface conditions reported by a given WCD located in the given coverage areas, such as by monitoring reference (or pilot) signal measurements and/or other channel quality measurements reported by the given WCD. While performing this monitoring, the entity may then update the stored data to reflect that the given WCD's reported air-interface conditions have changed, risen above a given threshold, fallen below a given threshold, etc. This stored data may take various forms, examples of which include a representation of the given WCD's reported air-interface conditions, a representation of recent changes in the given WCD's reported air-interface conditions, a data bit or other indication of whether the given WCD's reported air-interface conditions qualify it as a highly-mobile WCD (e.g., whether a rate of change in the given WCD's reported air-interface conditions exceeds a threshold), and a representation of the amount of time the given WCD has qualified as a highly-mobile WCD.

In yet another example, an entity may update the stored data indicating a mobility level of the WCDs located in the given coverage area based on both the velocity of WCDs located in the given coverage area and air-interface conditions reported by WCDs located in the given coverage area. And an entity may update the stored data indicating a mobility level of the WCDs located in the given coverage area in other manners as well.

Base station 22 may use the stored data indicating a mobility level of the WCDs located in the given coverage area to assess the number of WCDs located in the given coverage area that are highly mobile in various manners. In one example, base station 22 may simply count how many high-mobility data bits that have been set for the WCDs located in the given coverage area. In another example, base station 22 may compare the stored representation of velocity and/or change in air-interface conditions for each WCD located in the given coverage area to an appropriate threshold and count how many of these representations exceed the threshold. Other examples are possible as well.

According to another implementation, instead of relying on stored data indicating a mobility level of the WCDs located in the given coverage area, base station 22 may assess the number of WCDs located in the given coverage area that are highly mobile based on data that base station 22 generates during the assessment. This generated data may be similar in form to the stored data described above (e.g., based on velocity and/or air-interface conditions). Base station 22 may assess the number of WCDs located in the given coverage area that are highly mobile in other manners as well.

At step 56, after assessing the number of WCDs located in the given coverage area that are highly mobile, base station 22 may then compare that number to a threshold number of highly-mobile WCDs. This threshold number may be defined either manually (e.g., by a network operator) or automatically, and may take various forms. As one possible example, the threshold number may be set to reflect the number of highly-mobile WCDs in a coverage area that would be expected to cause an undesirable number of handovers between sub-coverage area beams of that coverage area. Other examples are possible as well.

At step 58, based on the comparison, base station 22 may determine that the number of highly-mobile WCDs located in the given coverage area is greater than or equal to the threshold number of highly-mobile WCDs. In response, at step 60, base station 22 may activate a global beam that serves WCDs located anywhere in the given coverage area. In a preferred example, this global beam will have the same carrier frequency and sector identifier as the beams defining the sub-coverage areas (but may have a unique sub-sector identifier). Base station 22 may carry out the activation of this global beam in various manners.

In practice, base station 22 may activate the global beam using a set of antenna elements within the antenna system that are arranged to provide coverage in the entirety of the given coverage area. In one implementation, for instance, base station 22 may activate the global beam using a set of "reserved" antenna elements that were previously arranged to form the global beam and were not in use prior to activation of the global beam. In an alternate implementation, however, base station 22 may activate the global beam using a set of antenna elements that were previously being used to form the first and/or second beams. According to this alternate implementation, prior to activating the global beam, base station 22 may thus need to deallocate antenna elements being used to form the first and/or second beams and then dynamically rearrange such antenna elements to form the global beam (e.g., by adjusting the phase and/or amplitude emitted by each such antenna element). In practice, this reallocation of antenna elements may result in a reduction in the coverage provided by the first and/or second beams, but the coverage provided by the global beam should compensate for any such reduction. Base station 22 may activate the global beam in other manners as well.

As part of the activation of the global beam, base station 22 may also adjust the resource distribution for the given coverage area, such that the global beam is distributed some portion of the given coverage area's resources. According to an LTE protocol, for instance, base station 22 may redistribute a certain portion of the given coverage area's total resource blocks from the first and/or second beams to the global beam (e.g., by adjusting the respective number of resource blocks that can be assigned on each of the beams). As another example, according to a 1xEV-DO protocol, base station 22 may redistribute a certain portion of the given coverage area's total timeslot resources (or code channels) from the first and/or second beams to the global beam (e.g., by adjusting the respective number of timeslot resources that can be assigned on each of the beams). Base station 22 may also redistribute resources from the first and/or second beams to the global beam in other manners. (It should also be understood that, in alternate implementations, base station 22 might reserve resources for the global beam that will not be used prior to its activation—in which case base station 22 may not need to reallocate resources from the beams defining the sub-coverage areas.)

At step 62, after activating the global beam, base station 22 may then assign at least one highly-mobile WCD located in the given coverage area to the global beam. Base station 22 may carry out this assignment in various manners.

According to one implementation, base station 22 may first select the at least one highly-mobile WCD located in given coverage area that will be assigned to the global beam. Base station 22 may perform this selection in various manners. As one example, base station 22 may simply select all highly-mobile WCDs located in the given coverage area. As another example, base station 22 may select a subset of the highly-mobile WCDs located in the given coverage area based on various criteria, examples of which include velocity, reported air-interface conditions, amount of time qualifying as a highly-mobile WCD, and operating state (e.g., active or idle). In each of these examples, base station 22 may use stored data indicating a mobility level of the WCDs located in the given coverage area to make the selection. Other examples are possible as well. For purposes of illustration only, the example embodiment will be described with reference to base station 22 selecting WCD 14*a*—which may be located in the outer sub-sector $S_B$ of sector $S_1$ at the time of the selection—as the at least one highly-mobile WCD located in given coverage area.

After selecting WCD 14*a*, base station 22 may optionally notify WCD 14*a* that base station 22 is assigning WCD 14*a* to the global beam. For example, base station 22 may be configured to send a notification of this assignment using resources assigned to WCD 14*a* on the second beam defining the outer sub-sector $S_B$ of sector $S_1$. If the global beam and the second beam have the same carrier frequency and sector identifier, however, it may not be necessary to notify WCD 14*a* that base station 22 is assigning WCD 14*a* to the global beam. Thus, in an alternate example, base station 22 may not be configured to notify WCD 14*a* that base station 22 is assigning WCD 14*a* to the global beam.

Regardless of whether it notifies WCD 14*a* of its assignment to the global beam, base station 22 may then stop assigning resources on the second beam to WCD 14*a* and begin assigning resources on the global beam to WCD 14*a*, such that base station 22 begins exchanging data with WCD 14*a* on the global beam. For example, according to an LTE protocol, base station 22 may stop assigning resource blocks on the second beam to WCD 14*a* and begin assigning resource blocks on the global beam to WCD 14*a*, such that base station 22 begins exchanging data with WCD 14*a* in resource blocks on the global beam. As another example, according to a 1xEV-DO protocol, base station 22 may stop assigning timeslots on the second beam to WCD 14*a* and begin assigning timeslots on the global beam to WCD 14*a*, such that base station 22 begins exchanging data with WCD 14*a* in timeslots on the global beam. Other examples are possible as well.

Base station 22 may also take other actions when assigning WCD 14*a* to the global beam, examples of which may include changing an association of a channel element from the second beam to the global beam.

After activating the global beam, base station 22 may also continue to assess the number of WCDs located in the given coverage area that are highly mobile and compare that number to a threshold number of highly-mobile WCDs (which could either be the same as the threshold number discussed above or a different number). At some point, base station 22 may then determine that the number of highly-mobile WCDs located in the given coverage area is less than this threshold number of highly-mobile WCDs. In response, base station 22 may (a) deactivate the global beam and (b) assign each WCD being served by the global beam to a beam defining a sub-coverage area in which the WCD is located. Base station 22 may perform these functions using techniques similar to those described above for activating the global beam and assigning WCDs to the global beam.

Figure 4:
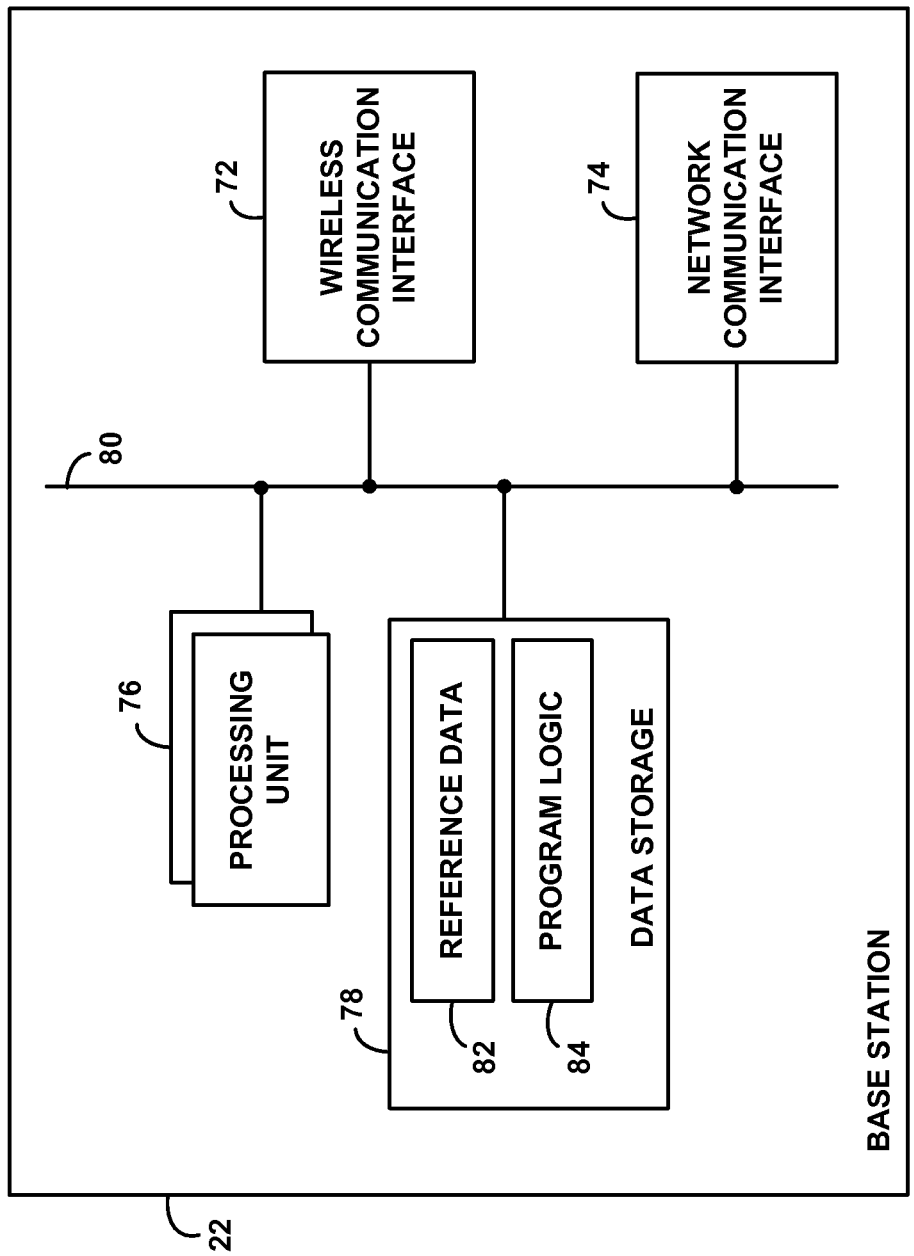
FIG. 4 is a simplified block diagram showing functional components that may be included in an example base station to facilitate implementation of the disclosed methods.

Turning now to FIG. 4, a simplified block diagram is shown to illustrate functional components that may be included in a representative base station, such as base station 22, to facilitate implementation of the disclosed methods. In particular, FIG. 4 shows representative base station 22 as including a wireless communication interface 72, a network communication interface 74, a processing unit 76, and data storage 78, all linked together via a system bus, network, or other connection mechanism 80. Base station 22 may include other components as well. (It should also be understood that at least some of these components may be considered to be part of a controller for base station 22.)

Wireless communication interface 72 may comprise an antenna system for emitting RF radiation to define one or more coverage areas in which base station 22 can engage in air-interface communication with WCDs, where the RF radiation in at least one coverage area takes the form of two or more distinct beams that define different respective sub-coverage areas in that coverage area. Additionally, the antenna system may also be capable of dynamically adjusting the RF radiation that defines the one or more coverage areas, including the distinct beams that define the respective sub-coverage areas in the at least one coverage area. Such an antenna system may be arranged in various manners.

According to one arrangement, the antenna system may include, for each coverage area, at least one directional (or sectored) array of antenna elements and associated RF components (e.g., power amplifiers and transceivers). The at least one antenna array and associated RF components for each coverage area may take various forms. As one example, in a configuration known as an "active antenna array," each of the array's antenna elements may be integrated with respective RF components (e.g., a respective power amplifier and transceiver) that control the antenna element individually. As another example, in a configuration known as a "passive antenna array," the array's antenna elements may be connected to a separate unit (e.g., a remote radio head) that houses the RF components and controls the antenna elements collectively. Because of these differences, a single active antenna array may be capable of forming multiple distinct beams in a given coverage area, while a single passive antenna array may only be capable of forming one beam. As such, in a preferred arrangement, the antenna system may include an active antenna array for each coverage area in which two or more distinct beams are to be formed. In an alternate arrangement, however, the antenna system may include multiple passive antenna arrays for each coverage area in which two or more distinct beams are to be formed. Other arrangements are also possible.

Network communication interface 74 generally serves to connect base station 22 to wireless carrier network 12 (e.g., via a controller and/or some other entity). Network communication interface 74 may thus take any suitable form to serve this purpose, examples of which include an Ethernet interface, a serial bus interface (e.g., Firewire, USB 2.0, etc.), a chipset and antenna adapted to facilitate wireless communication, and/or any other interface that provides for wired and/or wireless communication. Network communication interface 74 may also include multiple interfaces. Other configurations are possible as well.

Processing unit 76 may comprise one or more processor components, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), and/or any other processor components now known or later developed. Processing unit 76 may be integrated in whole or in part with other components of base station 22.

Data storage 78 may then comprise one or more non-transitory computer readable storage mediums, such as volatile data storage mediums (e.g., random access memory (RAM), registers, and/or cache) and/or non-volatile data storage mediums (e.g., read only memory (ROM), a hard-disk drive, a solid-state drive, flash memory, and/or an optical-storage device). Data storage 78 may also be integrated in whole or in part with other components of base station 22.

As shown in FIG. 4, data storage 78 may be arranged to contain reference data 82 and program logic 84. Reference data 82 may comprise various data usable by processing unit 76 to carry out various functions described herein. As one representative example, reference data 82 may include data about the base station's coverage areas, including data about the beams serving theses coverage areas. As another representative example, reference data 82 may include data about the WCDs located in the base station's coverage areas, such as data indicating a mobility level of such WCDs. Various other examples are possible as well.

Program logic 84 may then comprise machine language instructions or the like that may be executed or interpreted by processing unit 76 to carry out various functions described herein. For example, program logic 84 may be executable by processing unit 76 to (a) cause wireless communication interface 72 to emit a plurality of beams in a given coverage area, with each beam defining a different respective sub-coverage area of the given coverage area and serving WCDs located in the respective sub-coverage area, (b) detect that a threshold number of highly-mobile WCDs are located in the given coverage area, (c) in response to the detecting, cause wireless communication interface 72 to activate a global beam that serves WCDs located in any sub-coverage area of the given coverage area, (d) assign at least one of the highly-mobile WCDs to the global beam. Program logic 84 may be executable by processing unit 76 to carry out various other functions as well.

While example embodiments have been described above, those skilled in the art will understand that changes and modifications may be made to these embodiments without departing from the true scope and spirit of the present invention, which is defined by the claims.

We claim:
1. A method comprising:
    emitting a plurality of beams in a given coverage area of a radio access network (RAN), wherein each beam provides coverage in a different respective sub-coverage area of the given coverage area and serves wireless communication devices (WCDs) located in the respective sub-coverage area;
    detecting that there is a threshold number of highly-mobile WCDs located in the given coverage area;
    in response to the detecting, activating a global beam that provides coverage in every respective sub-coverage area of the given coverage area and serves WCDs located anywhere in the given coverage area; and assigning at least one highly-mobile WCD located in the given coverage area to the global beam.

2. The method of claim 1, wherein emitting the plurality of beams in the given coverage area comprises employing vertical beamforming to emit the plurality of beams in the given coverage area.

3. The method of claim 2, wherein the plurality of beams comprises a first beam that provides coverage in an inner sub-coverage area of the given coverage area and a second beam that provides coverage in an outer sub-coverage area of the given coverage area.

4. The method of claim 1, further comprising:
dynamically adjusting the plurality of beams that provide coverage in the respective sub-coverage areas based on one or more metrics that reflect WCD distribution in the given coverage area.

5. The method of claim 1, wherein detecting that there is the threshold number of highly-mobile WCDs located in the given coverage area comprises:
calculating a number of highly-mobile WCDs located in the given coverage area;
comparing the calculated number to the threshold number; and
based on the comparing, determining that the calculated number is greater than or equal to the threshold number.

6. The method of claim 5, wherein calculating the number of WCDs located in the given coverage area that are highly mobile comprises calculating the number of WCDs located in the given coverage area that are highly mobile based on data indicating a mobility level of WCDs located in the given coverage area.

7. The method of claim 1, wherein activating the global beam comprises activating the global beam using a given set of antenna elements that were prearranged to form the global beam and were not in use prior to activation of the global beam.

8. The method of claim 1, wherein activating the global beam comprises:
deallocating a given set of antenna elements being used to form the plurality of beams that provide coverage in the respective sub-coverage areas;
dynamically arranging the given set of antenna elements to form the global beam; and
activating the global beam using the given set of antenna elements.

9. The method of claim 1, wherein resources for the given coverage area are distributed between the plurality of beams that provide coverage in the respective sub-coverage areas before activating the global beam.

10. The method of claim 9, wherein activating the global beam comprises:
reallocating a given portion of the resources for the given coverage area from the plurality of beams that provide coverage in the respective sub-coverage areas to the global beam.

11. The method of claim 1, wherein assigning at least one highly-mobile WCD located in the given coverage area to the global beam comprises:
selecting the at least one highly-mobile WCD;
ceasing to assign resources to the at least one highly-mobile WCD on the beam that provides coverage in the respective sub-coverage area in which the at least one highly-mobile WCD is located; and
beginning to assign resources to the at least one highly-mobile WCD on the global beam.

12. The method of claim 11, further comprising:
after selecting the at least one highly-mobile WCD, notifying the at least one highly-mobile WCD of the assignment to the global beam.

13. The method of claim 1, further comprising:
after activating the global beam, detecting that there is no longer the threshold number of highly-mobile WCDs located in the given coverage area;
in response to detecting that there is no longer the threshold number of highly-mobile WCDs located in the given coverage area, (a) deactivating the global beam and (b) assigning each WCD being served by the global beam to the beam that provides coverage in the respective sub-coverage area in which the WCD is located.

14. A base station comprising:
a wireless communication interface for radiating to provide coverage in one or more coverage areas in which the base station can engage in air interface communication with wireless communication devices (WCDs);
a processing unit;
data storage; and
program instructions stored in the data storage and executable by the processing unit to carry out functions including:
(a) causing the wireless communication interface to emit a plurality of beams in a given coverage area, wherein each beam provides coverage in a different respective sub-coverage area of the given coverage area and serves WCDs located in the respective sub-coverage area;
(b) detecting that there is a threshold number of highly-mobile WCDs located in the given coverage area;
(c) in response to the detecting, causing the wireless communication interface to activate a global beam that provides coverage in every respective sub-coverage area of the given coverage area and serves WCDs located in any respective sub-coverage area of the given coverage area; and
(d) assigning at least one highly-mobile WCD located in the given coverage area to the global beam.

15. The base station of claim 14, wherein the wireless communication interface comprises at least one active antenna array.

16. The base station of claim 14, wherein the plurality of beams comprises a first beam that provides coverage in an inner sub-coverage area of the given coverage area and a second beam that provides coverage in an outer sub-coverage area of the given coverage area.

17. The base station of claim 14, further comprising program instructions stored in the data storage and executable by the processing unit to carry out functions including:
causing the wireless communication interface to dynamically adjust the plurality of beams that provide coverage in the respective sub-coverage areas based on one or more metrics that reflect WCD distribution in the given coverage area.

18. The base station of claim 14, wherein the program instructions stored in the data storage and executable by the processing unit to carry out the function of causing the wireless communication interface to activate the global beam comprises program instructions stored in the data storage and executable by the processing unit to cause the wireless communication interface to (i) deallocate a given set of antenna elements being used to form the plurality of beams that provide coverage in the respective sub-coverage areas, (ii) dynamically arrange the given set of antenna elements to form the global beam, and (iii) activate the global beam using the given set of antenna elements.

19. The base station of claim 14, further comprising data stored in the data storage that indicates a mobility level of WCDs located in the given coverage area.

20. A non-transitory computer readable medium having stored thereon instructions that are executable by a processing unit to carry out functions comprising:
- causing an antenna system to emit a plurality of beams in a given coverage area of a radio access network (RAN), wherein each beam provides coverage in a different respective sub-coverage area of the given coverage area and serves wireless communication devices (WCDs) located in the respective sub-coverage area;
- detecting that there is a threshold number of highly-mobile WCDs located in the given coverage area;
- in response to the detecting, causing the antenna system to activate a global beam that provides coverage in every respective sub-coverage area of the given coverage area and serves WCDs located in any respective sub-coverage area of the given coverage area; and
- assigning at least one highly-mobile WCD located in the given coverage area to the global beam.

\* \* \* \* \*